US012742704B2

(12) United States Patent
MacLean et al.

(10) Patent No.: US 12,742,704 B2
(45) Date of Patent: Sep. 22, 2026

(54) MACHINE LEARNING MODEL-BASED ACOUSTIC SIGNAL-TO-TEXT TRANSLATION

(71) Applicant: Disney Enterprises, Inc., Burbank, CA (US)

(72) Inventors: David MacLean, Orlando, FL (US); Erika Varis Doggett, Los Angeles, CA (US)

(73) Assignee: Disney Enterprises, Inc., Burbank, CA (US)

( * ) Notice: Subject to any disclaimer, the term of this patent is extended or adjusted under 35 U.S.C. 154(b) by 154 days.

(21) Appl. No.: 18/916,528

(22) Filed: Oct. 15, 2024

(65) Prior Publication Data

US 2026/0104325 A1 Apr. 16, 2026

(51) Int. Cl.

*G06F 40/58* (2020.01)
*G01H 17/00* (2006.01)
*G01M 99/00* (2011.01)

(52) U.S. Cl.

CPC .......... *G01M 99/005* (2013.01); *G01H 17/00* (2013.01); *G06F 40/58* (2020.01)

(58) Field of Classification Search

CPC ......... G01M 99/00; G01H 17/00; G06F 40/58
See application file for complete search history.

(56) References Cited

U.S. PATENT DOCUMENTS

| | | | | |
|---|---|---|---|---|
| 11,443,758 | B2 * | 9/2022 | Morikuni | G06N 3/0455 |
| 11,688,415 | B2 | 6/2023 | Jun et al. | |
| 11,848,027 | B2 * | 12/2023 | Krishnan | G10L 25/87 |
| 2022/0384040 | A1 * | 12/2022 | Comito | G16H 50/70 |

FOREIGN PATENT DOCUMENTS

| | | |
|---|---|---|
| CN | 117940996 A | 4/2024 |

OTHER PUBLICATIONS

International Search Report & Written Opinion for International Application PCT/US25/47906 dated Dec. 15, 2025.
Zied Minasri, Stefano Rovetta, Francesco Masulli "Anomalous Sound Event Detection: a Survey of Machine Learning Based Methods and Applications" Multimedia Tools and Applications, Dec. 27, 2021.

(Continued)

*Primary Examiner* — Elias Desta
(74) *Attorney, Agent, or Firm* — Farjami & Farjami LLP

(57) ABSTRACT

A system includes a processor and a memory storing software code and a machine learning (ML) model. The processor executes the software code to receive data including a sequence of acoustic signals or a corresponding spectrogram and an identifier of a source of the acoustic signals, translate, using the ML model, the acoustic signals or the spectrogram to one or more words each describing a respective acoustic signal pattern included in the sequence of acoustic signals or represented in the spectrogram, and obtain, using the identifier of the source, a predetermined word-based description of an acoustic signature of the source. The software code is further executed to determine, using the translated one or more words and the word-based description, whether an anomaly of the source is indicated, and output, when an anomaly is indicated, an alert.

22 Claims, 4 Drawing Sheets

(56) References Cited

OTHER PUBLICATIONS

Yong Xu, Qiang Huang, Wenwu Wang, Peter Foster, Siddharth Sigtia, Phillip J. B. Jackson, Mark D. Plumbley "Unsupervised Feature Learning Based on Deep Models for Environmental Audio Tagging" Transactions on Audio, Speech and Language Processing, vol. 25, No. Jun. 6, 2017.
Vishwajeet Shukla, Mayank Singour "Multimodal Learning for Early Detection of Explosive Sounds Using Relative Spectral Distribution" Sensor Signal Processing for Defence Conference Sep. 15, 2020.
Annamaria Mesaros, Toni Heittola, Tuomas Virtanen, Mark D. Plumbley "Sound Event Detection: a Tutorial" Signal Processing Magazine vol. 38, No. 5 Aug. 27, 2021.
Tuki Tagawa, Rytis Maskeliunas, Robertas Damasevicius "Acoustic Anomaly Detection of Mechanical Failures in Noisy Real-Life Factory Environments" Electronics 2021, 10, 2329 23 Pgs.
Naveed Khan "Anomaly Detection in industrial Equipment using Sound Signals" Jul. 1, 2023 12 Pgs. http github.cominaveed88375/AIML/tree/master/Anomaly%20Detection%20in%20Industrial%20Equipment.
"Audio Anomaly Detection" 2022 19 Pgs. https://sensiml.com/documentation/application-tutorials/audio-anomaly-detection.html.
"Audio-Based Anomaly Detection for Machine Health Monitoring" The Math Works, Inc. 2024 17 pgs.
Yuma Koizumi, Yohei Kawaguchi, Keisuke Imoto, Toshiki Nakamura, Yuki Nikaido, Ryo Tanabe, Harsh Purohit, Kaori Suefusa, Takashi Endo, Masahiro Yasuda, and Noboru Harada.
"Unsupervised Detection of Anomalous Sounds for Machine Condition Monitoring" proceedings of the Detection and Classification of Acoustic Scenes and Events 2020 Workshop Nov. 2020 15 Pgs.
Lili Tang, Hui Tian, Hui Huang, Shuangjin Shi, Qingzhi Ji "A Survey of Mechanical Fault Diagnosis Based on Audio Signal Analysis" ScienceDirect vol. 220, Oct. 2023 9 Pgs.

* cited by examiner

100
Computing Platform 102
Hardware Processor
104
System Memory 106
ML Model
114
136
137
138
Software Code 110
UI 116
140
120
134
132
118
142
140
118
Communication Network
108
130
128
118
130
118
150
Source of Sequence of Acoustic Signals
126
122
124

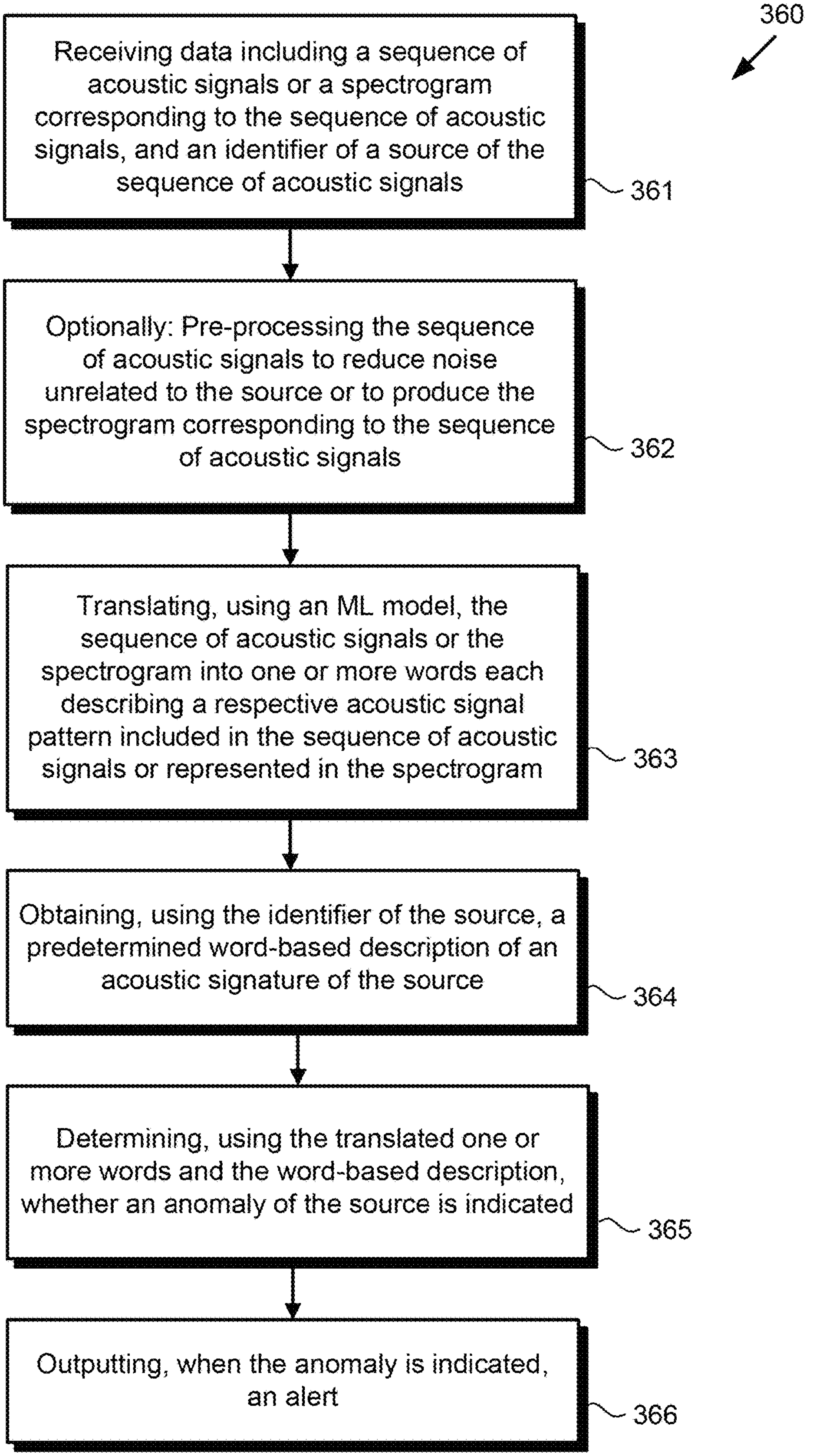

Fig. 3A
360
Receiving data including a sequence of acoustic signals or a spectrogram corresponding to the sequence of acoustic signals, and an identifier of a source of the sequence of acoustic signals
361
Optionally: Pre-processing the sequence of acoustic signals to reduce noise unrelated to the source or to produce the spectrogram corresponding to the sequence of acoustic signals
362
Translating, using an ML model, the sequence of acoustic signals or the spectrogram into one or more words each describing a respective acoustic signal pattern included in the sequence of acoustic signals or represented in the spectrogram
363
Obtaining, using the identifier of the source, a predetermined word-based description of an acoustic signature of the source
364
Determining, using the translated one or more words and the word-based description, whether an anomaly of the source is indicated
365
Outputting, when the anomaly is indicated, an alert
366

MACHINE LEARNING MODEL-BASED ACOUSTIC SIGNAL-TO-TEXT TRANSLATION

BACKGROUND

Mechanical systems experience wear and tear on the components that make up those systems. As the components degrade, the performance of a system deteriorates and eventually the system can fail. A system failure has many undesirable consequences including lost productivity, lost revenue, safety concerns for human operators, costly repairs and potentially environmental impacts. Even substandard system performance has possible consequences including product defects and lower productivity. Although persistent monitoring of mechanical systems can keep systems operating at peak performance, such monitoring can involve modifications to the system itself (e.g., the addition of mechanical and electrical sensors) which can themselves introduce more opportunities for failures and mechanical problems.

One approach to addressing the problem described above is mechanical fault diagnosis based on audio signal analysis (MFDA). MFDA typically involves recording audio signals of a system and comparing the audio to recordings of the same system in a known good state. When the new audio differs enough from the known good audio, an alert is triggered. However, conventional approaches to employing MFDA merely perform a comparison that results in a pass/fail result, with no specificity regarding the nature of the difference in sound. Alternatively, a system operator is presented with audio waveforms or other scientific representations of audio signals that do not correlate readily to the cause of an anomalous sound. This conventional approach has several drawbacks, including (i) when a difference in the audio is detected, it is difficult if not impossible to explain what the anomaly is, (ii) audio differences may be so subtle that a human cannot hear the difference and so would have little chance of determining what the cause of the anomaly is, and (iii) some anomalous sounds may be detected that are unrelated to the mechanical system, for example noise from a nearby system other than the system being monitored, noise from nearby people, noise from weather conditions, and the like. When the audio analysis is unable to identify the nature of a sound anomaly, false positives will almost inevitably result. Consequently, there is a need in the art for an anomaly detection solution capable of characterizing anomalous sounds generated by mechanical systems.

BRIEF DESCRIPTION OF THE DRAWINGS

FIG. 3A shows a flowchart presenting an exemplary method for performing ML model-based acoustic signal-to-text translation, according to one implementation.

DETAILED DESCRIPTION

Figure 1:
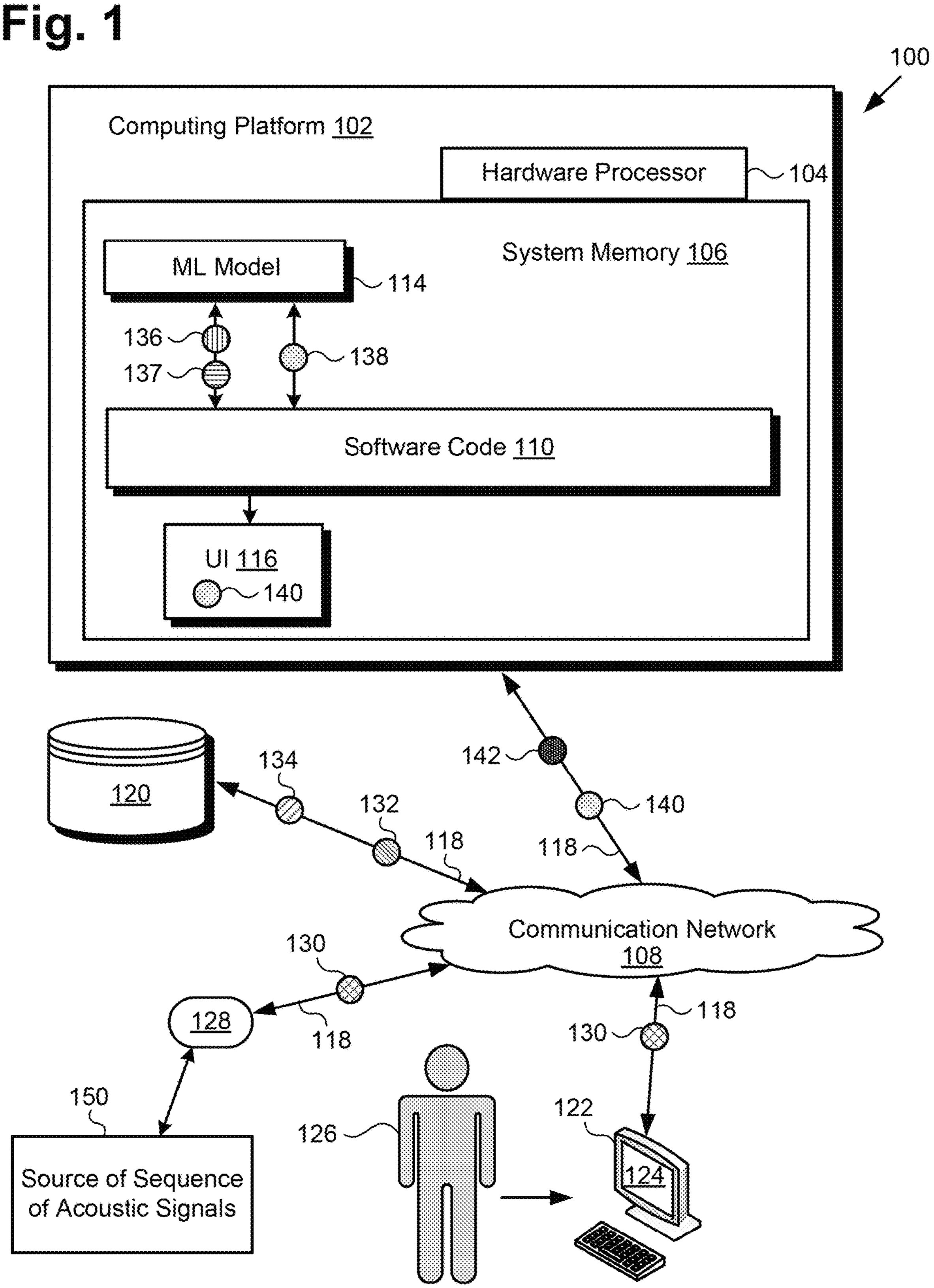
FIG. 1 shows an exemplary system for performing machine-learning (ML) model-based acoustic signal-to-text translation, according to one implementation.

The following description contains specific information pertaining to implementations in the present disclosure. One skilled in the art will recognize that the present disclosure may be implemented in a manner different from that specifically discussed herein. The drawings in the present application and their accompanying detailed description are directed to merely exemplary implementations. Unless noted otherwise, like or corresponding elements among the figures may be indicated by like or corresponding reference numerals. Moreover, the drawings and illustrations in the present application are generally not to scale, and are not intended to correspond to actual relative dimensions.

As stated above, conventional approaches to detecting anomalous performance by mechanical systems include mechanical fault diagnosis based on audio signal analysis (MFDA), and sensor-based monitoring, both of which have drawbacks. For example, and as also stated above, MFDA typically involves recording audio signals of a system and comparing the audio to recordings of the same system in a known good state. However, conventional approaches to employing MFDA merely perform a comparison that results in a pass/fail result, with no specificity regarding the nature of the difference in sound. When such audio analysis is unable to identify the nature of a sound anomaly, false positives will almost inevitably result.

The present application discloses machine learning (ML) model-based acoustic signal-to-text translation solutions that address and overcome the drawbacks and deficiencies in the conventional art. The novel and inventive systems and methods disclosed in the present application advance the state-of-the-art by introducing a solution that converts mechanical "speech" to descriptive words. By way of comparison, in the case of human speech-to-text conversion, the input is audio of human speech, and the output is text in the form of the spoken words. For a mechanical system, the "speech" is a sequence of acoustic signals that may include audio as well as vibrations that are inaudible to the human ear, while the output is one or more descriptive words that represent the sounds or actions that are detected. Information about those descriptive words can include a characterization of the detected sound or action (e.g., click, bang, whoosh, shake) as well as data characterizing the sound or action based on one or more of its frequencies, intensity and duration.

The acoustic signals that are expected for normal operation of the mechanical system can also be described as text or text and data, rather than by using an acoustic waveform. At the simplest level, the expected acoustic signal sequence could be described as a click, followed by a hum, a bang and finally another click. When an acoustic signal sequence generated by the same mechanical system at a later time does not match this expected sequence, an anomaly may be indicated. Instead of merely indicating that a generic anomaly has been detected, the analysis performed using the present solution can indicate, for example, that the hum was accompanied by a scraping sound, or that the bang was missing, or that the final click was much louder than expected. By contrast, when human voices or weather sounds such as thunder are detected, they can advantageously be identified as such and disregarded as being unrelated to the performance of the mechanical system.

By relating the physical components of the mechanical system to the sounds that are expected, the analysis of an anomaly performed according to the present novel and inventive solution can indicate the system component or components that should be investigated. For example, if the final click is a locking pin, the diagnosis could be that the locking pin could be out of alignment and need calibration. Giving instructions in this form to maintenance personnel is much more helpful than to simply state that there is an audio anomaly, or to require listening to various audio samples in an attempt to determine what the nature of the anomaly might be. Moreover, it is noted that the present ML model-based acoustic signal-to-text translation solution can advantageously be implemented as automated systems and methods.

As used in the present application, the terms "automation," "automated" and "automating" refer to systems and processes that do not require the participation of a human system operator. Although, in some implementations, a system operator or administrator may review, ratify, or override the anomalies detected, or the strategies for mitigation or elimination of those anomalies identified by the automated systems and according to the automated methods described herein, that human involvement is optional. Thus, the methods described in the present application may be performed under the control of hardware processing components of the disclosed automated systems.

It is also noted that, as defined in the present application, the expression "ML model" refers to a computational model for making predictions based on patterns learned from samples of data or training data. Various learning algorithms can be used to map correlations between input data and output data. These correlations form the computational model and can be used to make future predictions on new input data. Such a predictive model may include one or more logistic regression models, Bayesian models, artificial neural networks (NNs) such as Transformers, LLMs, or multi-modal foundation models, to name a few examples. In various implementations, ML models may be trained as classifiers and may be utilized to perform image processing, audio processing, natural-language processing, and other inferential analyses. A "deep neural network," in the context of deep learning, may refer to a NN that utilizes multiple hidden layers between input and output layers, which may allow for learning based on features not explicitly defined in raw data. As used in the present application, a feature identified as a NN refers to a deep neural network. It is noted that the use of an ML model specifically configured and trained to translate acoustic signals to descriptive words represents a significant advantage of the present solution over conventional solutions that do not harness the inferencing power of ML models.

FIG. 1 shows exemplary system 100 for performing ML model-based acoustic signal-to-text translation, according to one implementation. As shown in FIG. 1, system 100 includes computing platform 102 having hardware processor 104 and system memory 106 implemented as a computer-readable non-transitory storage medium. According to the present exemplary implementation, system memory 106 stores software code 110 and ML model 114 trained to translate acoustic signal patterns or spectrograms of those acoustic signal patterns into words (hereinafter "trained ML model 114"). Also shown in FIG. 1 is user interface (UI) 116 provided by software code 110.

As further shown in FIG. 1, system 100 is implemented within a use environment including communication network 108, network communication links 118, database 120, user system 122 including display 124, and user 126 of system 100 and user system 122. In addition, FIG. 1 shows one or more sensors 128 (hereinafter "sensor(s) 128") and source 150 of sequence 136 of acoustic signals captured by sensor (s) 128. Also shown in FIG. 1 are data 130 received by system 100 from sensor(s) 128 and including sequence 136 of acoustic signals or spectrogram 137 corresponding to sequence 136 of acoustic signals, and an identifier of source 150, word based description 132 of an acoustic signature of source 150, operating history 134 of source 150, one or more words 138 (hereinafter "word(s) 138") each describing a respective acoustic signal pattern included in sequence 136 of acoustic signals or represented in spectrogram 137, alert 140 and command 142.

It is noted that sensor(s) 128 may include one or more microphones for capturing audio, one or more accelerometers for capturing movement and vibrations, or one or more microphones and one or more accelerometers. It is noted that in some implementations, some or all of sensor(s) 128 may be situated in the vicinity of source 150 but may not be mounted on or otherwise in physical contact with source 150. Moreover, although database 120 is depicted as a database remote from system 100 and accessible via communication network 108 and network communication links 118, that representation is merely by way of example. In other implementations, database 120 may be included as a feature of system 100 and may be stored in system memory 106.

Although the present application refers to software code 110 and trained ML model 114 as being stored in system memory 106 for conceptual clarity, more generally, system memory 106 may take the form of any computer-readable non-transitory storage medium. The expression "computer-readable non-transitory storage medium," as defined in the present application, refers to any medium, excluding a carrier wave or other transitory signal, that provides instructions to hardware processor 104 of computing platform 102. Thus, a computer-readable non-transitory storage medium may correspond to various types of media, such as volatile media and non-volatile media, for example. Volatile media may include dynamic memory, such as dynamic random access memory (dynamic RAM), while non-volatile memory may include optical, magnetic, or electrostatic storage devices. Common forms of computer-readable non-transitory storage media include, for example, internal and external hard drives, optical discs, RAM, programmable read-only memory (PROM), erasable PROM (EPROM) and FLASH memory.

Moreover, in some implementations, system 100 may utilize a decentralized secure digital ledger in addition to system memory 106. Examples of such decentralized secure digital ledgers may include a blockchain, hashgraph, directed acyclic graph (DAG), and Holochain® ledger, to name a few. In use cases in which the decentralized secure digital ledger is a blockchain ledger, it may be advantageous or desirable for the decentralized secure digital ledger to utilize a consensus mechanism having a proof-of-stake (PoS) protocol, rather than the more energy intensive proof-of-work (PoW) protocol.

Although FIG. 1 depicts software code 110 and trained ML model 114 as being co-located in system memory 106, that representation is also provided merely as an aid to conceptual clarity. More generally, system 100 may include one or more computing platforms 102, such as computer servers for example, which may be co-located, or may form an interactively linked but distributed system, such as a cloud-based system, for instance. As a result, hardware processor 104 and system memory 106 may correspond to distributed processor and memory resources within system 100. Consequently, in some implementations, software code 110 and trained ML model 114 may be stored remotely from one another on the distributed memory resources of system 100. It is also noted that, in some implementations, trained ML model 114 may take the form of one or more software modules included in software code 110.

Hardware processor 104 may include multiple hardware processing units, such as one or more central processing units, one or more graphics processing units, and one or more tensor processing units, one or more field-programmable gate arrays (FPGAs), custom hardware for ML training or inferencing, and an application programming interface (API) server, for example. By way of definition, as used in the present application, the terms "central processing unit" (CPU), "graphics processing unit" (GPU), and "tensor processing unit" (TPU) have their customary meaning in the art. That is to say, a CPU includes an Arithmetic Logic Unit (ALU) for carrying out the arithmetic and logical operations of computing platform 102, as well as a Control Unit (CU) for retrieving programs, such as software code 110, from system memory 106, while a GPU may be implemented to reduce the processing overhead of the CPU by performing computationally intensive graphics or other processing tasks. A TPU is an application-specific integrated circuit (ASIC) configured specifically for AI processes such as ML modeling.

In some implementations, computing platform 102 may include one or more web servers, accessible over a packet-switched network such as the Internet, for example. Alternatively, computing platform 102 may include one or more computer servers supporting a private wide area network (WAN), local area network (LAN), or included in another type of limited distribution or private network. In addition, or alternatively, in some implementations, system 100 may utilize a local area broadcast method, such as User Datagram Protocol (UDP) or Bluetooth®, for instance to communicate with user system 122. Furthermore, in some implementations, system 100 may be implemented virtually, such as in a data center. For example, in some implementations, system 100 may be implemented in software, or as virtual machines. Moreover, in some implementations, system 100 may be configured to communicate via a high-speed network suitable for high performance computing (HPC). Thus, in some implementations, communication network 108 may be or include a 10 GigE network or an Infiniband network, for example.

With respect to the architecture of trained ML model 114, there are different possibilities based on conventional pipelines for performing speech-to-text (STT) conversion, in which an acoustic encoder is trained to transform acoustic signals to latent acoustic tokens, and then a decoder-type model transforms those latent acoustic tokens to text-like tokens. In standard STT, this decoder often feeds into a language model that makes decisions, based on the text-like tokens and a history of text-like tokens previously uttered, as to what word is most likely to have been said, as a disambiguation step. By contrast trained ML model 114 may omit the language model and instead provide the sequence of text-like tokens as words describing sounds, optionally in combination with information regarding at least one of duration, intensity, or timing of those sounds. By way of example, an acoustic encoder implemented as part of trained ML model 114 may output [vector] [vector] [vector] [vector] [vector] [vector], and the decoder of trained ML model 114 may produce [click] {duration: timestep-timestep} [bang] {duration: timestep-timestep}, and so forth.

Another option for architecture of trained ML model 114 is for the architecture to include a visual encoder, e.g., based on a convolutional neural network, diffusion-style variable autoencoder, or any of a number of computer vision foundation models, to process the acoustic waveforms or spectrograms to extract visual features, which are then the latent tokens fed to the decoder and processed in a manner analogous to that described in the previous paragraph.

It is noted that, although user system 122 is shown as a desktop computer in FIG. 1, that representation is provided merely by way of example. In other implementations, user system 122 may take the form of any suitable mobile or stationary computing device or system that implements data processing capabilities sufficient to support UI 116, as well as connections to communication network 108, and perform the functionality ascribed to user system 122 herein. That is to say, in other implementations, user system 122 may take the form of a laptop computer, tablet computer, or smartphone, to name a few examples. Alternatively, in some implementations, user system 122 may be a "dumb terminal" peripheral device of system 100. In those implementations, user system 122 may be controlled by hardware processor 104 of computing platform 102.

It is also noted that display 124 of user system 122 may take the form of a liquid crystal display (LCD), a light-emitting diode (LED) display, an organic light-emitting diode (OLED) display, a quantum dot (QD) display, or any other suitable display screen that perform a physical transformation of signals to light. Furthermore, display 124 may be physically integrated with user system 122 or may be communicatively coupled to but physically separate from user system 122. For example, where user system 122 is implemented as a smartphone, laptop computer, or tablet computer, display 124 will typically be integrated with user system 122. By contrast, where user system 122 is implemented as a desktop computer, display 124 may take the form of a monitor separate from user system 122 in the form of a computer tower.

Figure 2:
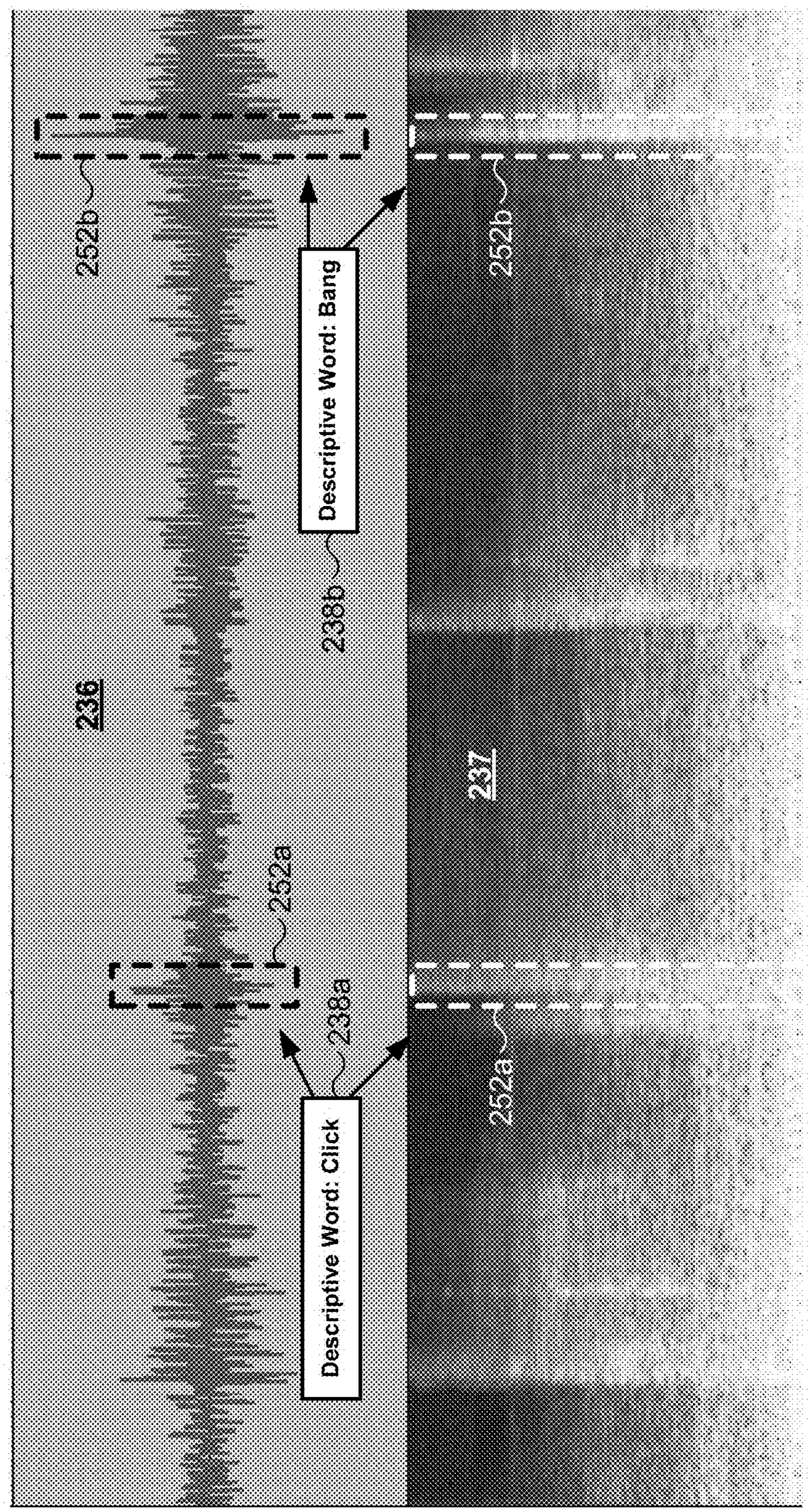
FIG. 2 shows a sequence of acoustic signals generated by a mechanical system during operation, and a spectrogram corresponding to the sequence of acoustic signals, according to one implementation.

FIG. 2 shows sequence 236 of acoustic signals generated by a source, i.e., source 150, in FIG. 1, during operation of source 150, according to one implementation, as well as spectrogram 237 corresponding to sequence 236 of acoustic signals, which may be a Mel Spectrogram using the Mel Scale for example, as known in the art. Also shown in FIG. 2 are exemplary acoustic signal patterns **252*a* and 252*b* included in sequence 236 of acoustic signals and represented in spectrogram 237, as well as descriptive words 238*a* and 238*b* applied to respective acoustic signal patterns 252*a* and 252*b* by an ML model trained to translate acoustic signal patterns or spectrograms of those acoustic signal patterns to descriptive words, i.e., trained ML model 114, in FIG. 1. It is noted that sequence 236 of acoustic signals, spectrogram 237, and descriptive words 238*a* and 238*b*, in FIG. 2, correspond respectively in general to sequence 136 of acoustic signals, spectrogram 137, and word(s) 138, in FIG. 1. Consequently, sequence 236 of acoustic signals, spectrogram 237, and descriptive words 238*a* and 238*b* may share any of the characteristics attributed to respective sequence 136 of acoustic signals, spectrogram 137, and word(s) 138** by the present disclosure, and vice versa.

Referring to FIGS. 1 and 2 in combination, in the exemplary use case shown in FIG. 2, acoustic signal pattern **238*a* included in sequence 136/236 of acoustic signals or represented in spectrogram 137/237 has been interpreted by trained ML model 114 as a click, while acoustic signal pattern 238*b* included in sequence 136/236 of acoustic signals or represented in spectrogram 137/237 has been interpreted by trained ML model 114 as a bang. Other possible descriptive words suitable for use in characterizing acoustic signal patterns included in sequence 136/236 of acoustic signals or represented in spectrogram 137/237** include clank, clunk, scrape, hiss, whoosh, whir, hum and shake, to name merely a few. Moreover, in some implementations, the descriptive word applied to an acoustic signal pattern may be accompanied by data characterizing one or more of the time duration, intensity, e.g., audio volume or shaking force, or frequency included in the acoustic signal pattern.

Although FIG. 2 highlights the presence of two acoustic signal patterns in sequence 136/236 of acoustic signals, in various implementations sequence 136/236 of acoustic signals may include as few as one acoustic signal pattern, or more than two acoustic signal patterns. Furthermore, the descriptive words to which the acoustic signal patterns included in sequence 136/236 of acoustic signals or represented in spectrogram 137/237 are translated by trained ML model 114 may be selected from a closed predetermined vocabulary of words used to train ML model 114. It is noted that in some use cases, one or more of acoustic signal patterns 252*a* and 252*b* may include "mechanical formants" analogous to formants used to identify phonemes in human speech, where mechanical formants are defined in the present application as bands of frequency characteristic of particular mechanical sounds.

Figure 3B:
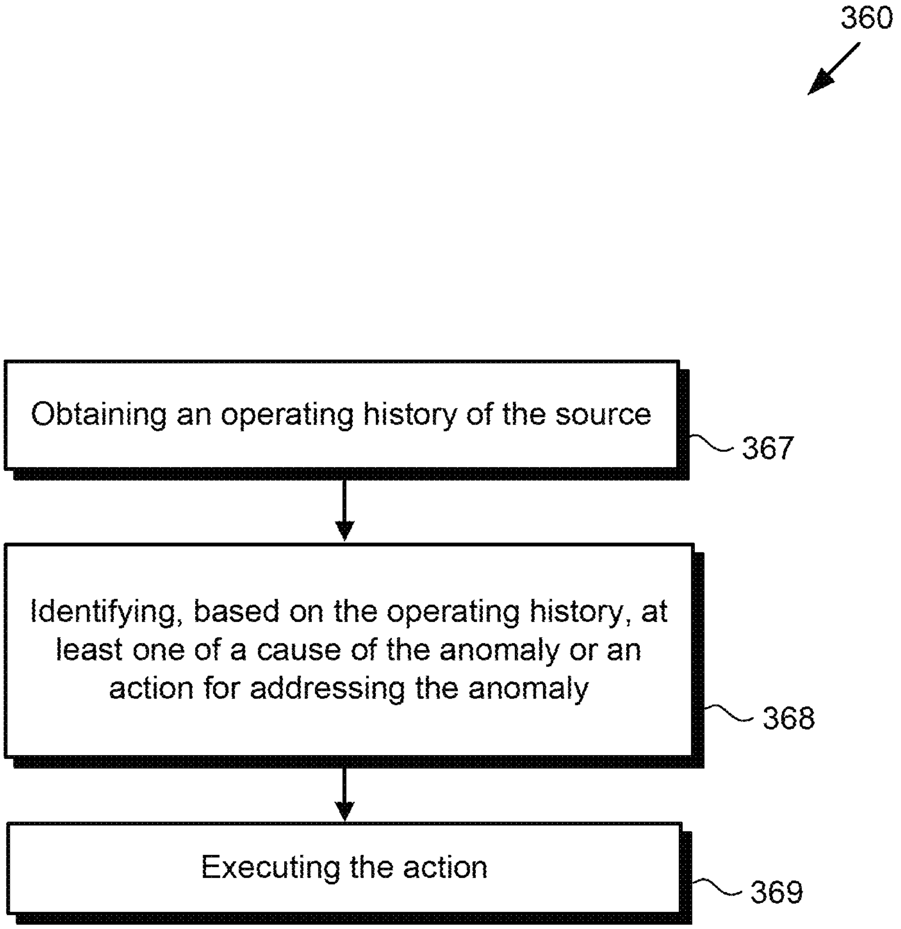
FIG. 3B shows a flowchart including additional actions for extending the exemplary method outlined in FIG. 3A, according to one implementation.

The functionality of system 100, software code 110 and trained ML model 114 will be further described by reference to FIGS. 3A and 3B. FIG. 3A shows flowchart 360 presenting an exemplary method for performing ML model-based acoustic signal-to-text translation, while FIG. 3B shows additional actions for extending the method outlined in FIG. 3A, according to one implementation. With respect to the actions described in FIGS. 3A and 3B, it is noted that certain details and features have been left out of flowchart 360 in order not to obscure the discussion of the inventive features in the present application.

Referring to FIG. 3A in combination with FIGS. 1 and 2, flowchart 360 begins with receiving data 130 including sequence 136/236 of acoustic signals or spectrogram 137/237 corresponding to sequence 136/236 of acoustic signals, and an identifier of source 150 of sequence 136/236 of acoustic signals (action 361). As noted above, source 150 may be a mechanical system. In various implementations, source 150 may be or include a baggage claim carousel, an automated warehouse, a theme park attraction, one or more vehicle assembly line machines, an aviation system, a heating, ventilation, and air conditioning (HVAC) system, an engine, machinery/manufacturing equipment, or a computer server, to name a few examples. As further noted above, the acoustic signals included in sequence 136/236 of acoustic signals may include humanly audible audio signals, humanly inaudible vibrations, or a combination of humanly audible audio signals and humanly inaudible vibrations.

Moreover, and as also noted above, in addition to sequence 136/236 of acoustic signals or spectrogram 137/237 and the identifier of source 150 of sequence 136/236 of acoustic signals, data 130 may further include data characterizing one or more of the time duration, intensity, or frequency spectra of the acoustic signals included in sequence 136/236 of acoustic signals and represented in spectrogram 137/237. Data 130 may be received, in action 361, by software code 110, executed by hardware processor 104 of system 100. As shown in FIG. 1, in some use cases, data 130 may be received by system 100 from sensor(s) 128, via communication network 108 and network communication links 118. However, in other use cases, user 126 of user system 122 may obtain data 130 from sensor(s) 128 and may transmit data 130 to system 100 via communication network 108 and network communication links 118. Thus, in some use cases, system 100 may receive data 130, in action 361, from user system 122.

Continuing to refer to FIGS. 1, 2, and 3A in combination, in some implementations, flowchart 360 may further include pre-processing sequence 136/236 of acoustic signals to reduce signal noise unrelated to source 150, to produce spectrogram 137/237 corresponding to sequence 136/236 of acoustic signals, or to produce spectrogram 137/237 after reducing signal noise in sequence 136/236 of acoustic signals (action 362). It is noted that action 362 is optional, and in some implementations may be omitted from the method outlined by flowchart 360. In some implementations in which action 362 is included in the method outlined by flowchart 369, action 362 may be performed by software code 110, executed by hardware processor 104 of system 100, and using any one or more conventional signal processing algorithms known in the art. Alternatively, or in addition, sensor(s) 128 may include one or more environmental sensors for detecting background noise audible in the vicinity of source 150, such as noise produced by mechanical systems other than source 150, crowd noise such as footfalls or voices, event noise such as public address broadcasts, music, and the like, and weather noise such as rainfall, wind, and thunder, to name a few examples. In implementations in which sensor(s) 128 are used to detect such background noise, that background noise may be subtracted from sequence 136/236 of acoustic signals in optional action 362, and that subtraction may then be followed by production of spectrogram 137/237 after such background noise has been removed.

Continuing to refer to FIGS. 1, 2, and 3A in combination, flowchart 360 further includes translating, using trained ML model 114, sequence 136/236 of acoustic signals or spectrogram 137/237 to word(s) 138/238*a*/238*b* each describing a respective acoustic signal pattern, e.g., acoustic signal patterns 252*a* and 252*b*, included in sequence 136/236 of acoustic signals or represented in spectrogram 137/237 (action 363). It is noted that, in some implementations, action 363 may be performed using sequence 136/236 of acoustic signals received in action 361, without pre-processing of sequence 136/236 of acoustic signals in optional action 362. However, in other implementations, action 363 may be performed on sequence 136/236 of acoustic signals after sequence 136/236 of acoustic signals is pre-processed in optional action 362 to reduce signal noise unrelated to source 150, as described above. In yet other implementations, action 363 may be performed on spectrogram 137/237.

Trained ML model 114 may be trained to apply one or more descriptive words from a predetermined vocabulary of words corresponding to mechanical sounds or actions. As noted above, those words may include click, bang, clank, clunk, scrape, hiss, whoosh, whir, hum and shake, to name a few examples. Moreover, in some implementations, trained ML model 114 may be configured to further characterize the sound or action by a description of its time duration or intensity, for instance, based on predetermined thresholds for each type of sound or action. For example, a click, bang or any other descriptive word may be further characterized as one or more of loud, quiet, hard, slight, long, or short, such as, for instance, a "long hard shake" or a "short loud click." The translation of sequence 136/236 of acoustic signals or spectrogram 137/237 to word(s) 138/238*a*/238*b* each describing a respective acoustic signal pattern included in sequence 136/236 of acoustic signals or represented in spectrogram 137/237 may be performed, in action 363, by software code 110, executed by hardware processor 104 of system 100.

It is noted that, in some implementations, software code 110 may be executed by hardware processor 104 of system 100 to perform the training of trained ML model 114. In those implementations, hardware processor 104 may executed software code 110 to obtain an annotated dataset including acoustic signal patterns each tagged with a respective word or words included in a predetermined vocabulary of mechanical sounds or actions. Hardware processor 104 may further execute software code 110 to partition that annotated dataset into a training dataset including a first subset of the acoustic signal patterns and respective word tags, and a validation dataset including a second subset of the acoustic signal patterns and respective word tags, and to train, using the training dataset, ML model 114 to translate the first subset of the acoustic signal patterns to the first subset of respective word tags. Hardware processor 104 may then execute software code 110 to validate, using the validation dataset, ML model 114 and to deploy trained ML model 114 for use.

Continuing to refer to FIGS. 1, 2, and 3A in combination, flowchart 360 further includes obtaining, using the identifier of source 150 included in data 130, predetermined word-based description 132 of an acoustic signature of source 150 (action 364). It is noted that the acoustic signature of source 150 corresponds to a sequence of acoustic signals generated by source 150 while source 150 is operating in a known good state, free of any anomalies or malfunctions. It is further noted that the acoustic signature of source 150 may include humanly audible audio signals, humanly inaudible vibrations, or humanly audible audio signals and humanly inaudible vibrations. Word-based description 132 of the acoustic signature of source 150 may be stored in database 120, for example, and may be obtained from database 120, in action 364, by software code 110, executed by hardware processor 104 of system 100.

It is also noted that although flowchart 360 depicts action 364 as following action 363, as well as optional action 362 when performed, that representation is merely provided as an example. In various implementations, action 364 may precede either or both of optional action 362 and action 363, may follow optional action 362 but precede action 363, may follow action 363, or may be performed in parallel with, i.e., contemporaneously with, either optional action 362 or action 363.

Continuing to refer to FIGS. 1, 2, and 3A in combination, flowchart 360 further includes determining, using translated word(s) 138/238*a*/238*b* provided by trained ML model 114 in action 363, and word-based description 132 of the acoustic signature of source 150, whether an anomaly of source 150 is indicated (action 365). Action 365 may be performed by software code 110, executed by hardware processor 104 of system 100, based on one or more of a variety of criteria. For example, software code 110 may determine that an anomaly of source 150 is indicated if word(s) 138/238*a*/238*b* translated from the one or more acoustic signal patterns included in sequence 136/236 of acoustic signals or represented in spectrogram 137/237 is/are omitted from word-based description 132. Alternatively, or in addition, software code 110 may determine that an anomaly of source 150 is indicated if one or more words included in word-based description 132 is/are omitted from word(s) 138/238*a*/238*b* translated from the one or more acoustic signal patterns included in sequence 136/236 of acoustic signals or represented in spectrogram 137/237.

As another alternative, software code 110 may determine that an anomaly of source 150 is indicated if the same one or more words are included in word(s) 138/238*a*/238*b* translated from the one or more acoustic signal patterns included in sequence 136/236 of acoustic signals or represented in spectrogram 137/237, and in word-based description 132, but any of those one or more words are in a different word order than in word-based description 132. As yet another alternative, software code 110 may determine that an anomaly of source 150 is indicated if the same one or more words are included in the same word order in word(s) 138/238*a*/238*b* translated from the one or more acoustic signal patterns included in sequence 136/236 of acoustic signals or represented in spectrogram 137/237, and in word-based description 132, but the time gap between the same two sequential words varies between word(s) 138/238*a*/238*b* and word-based description 132 by more than a predetermined timing threshold. As yet another alternative, software code 110 may determine that an anomaly of source 150 is indicated if the same one or more words are included in the same word order in word(s) 138/238*a*/238*b* translated from the one or more acoustic signal patterns included in sequence 136/236 of acoustic signals or represented in spectrogram 137/237, and in word-based description 132, but one or more of the time duration, intensity, or frequency spectrum of the same words varies between word(s) 138/238*a*/238*b* and word-based description 132 by more than respective predetermined time duration, intensity, or frequency spectrum thresholds.

Continuing to refer to FIGS. 1, 2, and 3A in combination, flowchart 360 further includes outputting, when the anomaly is indicated, alert 140. In some implementations, the alert includes word(s) 138/238*a*/238*b* translated from the one or more acoustic signal patterns included in sequence 136/236 of acoustic signals or represented in spectrogram 137/237, word-based description 132, or word(s) 138/238*a*/238*b* translated from the one or more acoustic signal patterns included in sequence 136/236 of acoustic signals or represented in spectrogram 137/237 and word-based description 132 (action 366). As shown in FIG. 1, alert 140 may be displayed via UI 116, may be transmitted to user system 122 via communication network 108 and network communication links 118, or both. In addition, in some implementations alert 140 may be saved to database 120, may be persistently stored in system memory 106, may be stored to another computer-readable non-transitory storage medium, or any combination thereof. Alert 140 may be output, in action 366, by software code 110, executed by hardware processor 104 of system 100.

In some implementations, the method described by reference to flowchart 360 may conclude with action 366 described above. However, as shown by FIG. 3B, in some implementations, the method outlined in FIG. 3A may be extended by the additional actions described by reference to FIG. 3B.

Referring to FIG. 3B in combination with FIGS. 1 and 2, flowchart 360 may further include obtaining, when the anomaly is indicated, operating history 134 of source 150 (action 367). Operating history 134 of source 150 may identify previous anomalies in the performance by source 150, as well as previously translated words based on sequences of acoustic signals generated by source 150 when operating anomalously, and in some use cases, respective causes of previous anomalies, respective actions for addressing previous anomalies, or both.

Operating history 134 of source 150 may be obtained, in action 367, by software code 110, executed by hardware processor 104 of system 100. As shown in FIG. 1, in some use cases, operating history 134 of source 150 may be obtained by system 100 from database 120, via communication network 108 and network communication links 118.

Continuing to refer to FIGS. 1, 2, and 3B in combination, flowchart 360 may further include identifying, based on operating history 134 of source 150, at least one of a cause of the anomaly determined to be indicated in action 365 or an action for addressing that anomaly (action 368). As noted above, operating history 134 of source 150 may identify previous anomalies in the performance by source 150, as well as previously translated words based on sequences of acoustic signals generated by source 150 when operating anomalously, and in some use cases, respective causes of previous anomalies, respective actions for addressing those previous anomalies, or causes as well as actions for addressing those previous anomalies.

Action 368 may include comparing word(s) 138/238*a*/238*b* translated from the one or more acoustic signal patterns included in sequence 136/236 of acoustic signals or represented in spectrogram 137/237 with previously translated words based on sequences of acoustic signals generated by source 150 when operating anomalously. Identical or substantially similar word patterns may be associated with the same or similar causes and may be addressed by the same or similar actions used to address previous anomalies. Identification of the cause of the anomaly of source 150 determined to be indicated in action 365, the action for addressing that anomaly, or both, may be performed, in action 368, by software code 110, executed by hardware processor 104 of system 100.

It is noted that although flowchart 360 depicts actions 367 and 368 as following action 366, that representation merely emphasizes the optional nature of actions 367 and 368. In implementations in which actions 367 and 368 are performed, action 367 precedes action 368, and both of actions 367 and 368 precede action 366. Moreover, in implementations in which actions 367 and 368 are performed, alert 140 may include the at least one of the cause of the anomaly of source 150 or the action for addressing that anomaly identified in action 368.

In some implementations, the method outlined by flowchart 360 may conclude with action 368 described above. However, in some implementations in which action 368 includes identifying the action for addressing the anomaly of source 150, flowchart 360 may further include executing that action (action 369). For example, where the anomaly of source 150 is identified as one having safety or environmental implications, executing the action for addressing the anomaly may include powering down source 150. Action 369 may be performed by software code 110, executed by hardware processor 104 of system 100.

With respect to the method outlined by flowchart 360, it is noted that, in various implementations, actions 361, 363, 364, 365 and 366, or actions 361, 362, 363, 364, 365 and 366 (hereinafter "actions 361-366"), or actions 361, 363, 364, 365, 366, 367 and 368, or actions 361-366, 367, and 368 (hereinafter "actions 361-368"), or actions 361, 363, 364, 365, 366, 367, 368 and 369, or actions 361-368 and 369, may be performed in an automated process from which human participation may be omitted.

Thus, the present application discloses systems and methods for performing ML model-based acoustic signal-to-text translation that addresses and overcomes the drawbacks and deficiencies in the conventional art. The systems and methods disclosed in the present application advance the state-of-the-art in several ways, including (i) providing a language based comprehensible description of an anomalous sound or action generated by a mechanical system during operation, (ii) the ability to detect audio differences so subtle that a human cannot hear the difference and so would have little chance of identifying the presence of an anomaly or its nature, and (iii) the ability to distinguish mechanical sounds and actions from sounds and actions resulting from the presence of people or the occurrence of natural phenomena unrelated to the operation of a mechanical system being analyzed.

From the above description it is manifest that various techniques can be used for implementing the concepts described in the present application without departing from the scope of those concepts. Moreover, while the concepts have been described with specific reference to certain implementations, a person of ordinary skill in the art would recognize that changes can be made in form and detail without departing from the scope of those concepts. As such, the described implementations are to be considered in all respects as illustrative and not restrictive. It should also be understood that the present application is not limited to the particular implementations described herein, but many rearrangements, modifications, and substitutions are possible without departing from the scope of the present disclosure.

What is claimed is:

1. A system comprising:
- a hardware processor and a system memory storing a software code and a machine learning (ML) model;
- the hardware processor configured to execute the software code to:
  - receive data including a sequence of acoustic signals or a spectrogram corresponding to the sequence of acoustic signals, and an identifier of a source of the sequence of acoustic signals;
  - translate, using the ML model, the sequence of acoustic signals or the spectrogram to one or more words each describing a respective acoustic signal pattern included in the sequence of acoustic signals or represented in the spectrogram;
  - obtain, using the identifier of the source, a predetermined word-based description of an acoustic signature of the source;
  - determine, using the translated one or more words and the word-based description, whether an anomaly of the source is indicated; and
  - output, when the anomaly is indicated, an alert.

2. The system of claim 1, wherein the hardware processor is further configured to execute the software code to:
- pre-process the sequence of acoustic signals, before translating the sequence of acoustic signals to the one or more words, to reduce signal noise unrelated to the source.

3. The system of claim 1, wherein the hardware processor is further configured to execute the software code to:
- obtain, when the anomaly is indicated, an operating history of the source; and
- identify, based on the operating history, at least one of a cause of the anomaly or an action for addressing the anomaly.

4. The system of claim 3, wherein the alert includes at least one of the translated one or more words, the word-based description, the cause of the anomaly, or the action for addressing the anomaly.

5. The system of claim 1, wherein the hardware processor is further configured to execute the software code to:
- obtain, when the anomaly is indicated, an operating history of the source;
- identify, based on the operating history, an action for addressing the anomaly; and
- execute the action.

6. The system of claim 5, wherein executing the action comprises powering down the source.

7. The system of claim 1, wherein the source is a mechanical system.

8. The system of claim 1, wherein the source comprises one of a baggage claim carousel, an automated warehouse, a theme park attraction, a vehicle assembly line machine, an aviation system, a HVAC system, an engine, manufacturing equipment, or a computer server.

9. The system of claim 1, wherein at least one of the acoustic signature or the sequence of acoustic signals comprises humanly audible audio signals.

10. The system of claim 1, wherein at least one of the acoustic signature or the sequence of acoustic signals comprises humanly inaudible vibrations.

11. The system of claim 1, wherein the hardware processor is further configured to execute the software code to train the ML model by:

obtaining an annotated dataset including a plurality of acoustic signal patterns each tagged with a respective word included in a predetermined vocabulary of mechanical sounds or actions;

partitioning the annotated dataset into a training dataset including a first subset of the plurality of acoustic signal patterns and respective word tags, and a validation dataset including a second subset of the plurality of acoustic signal patterns and respective word tags;

training, using the training dataset, the ML model to translate the first subset of the plurality of acoustic signal patterns to the first subset of respective word tags; and validating, using the validation dataset, the ML model for use.

12. The method of claim 11, further comprising:

obtaining, by the software code executed by the hardware processor when the anomaly is indicated, an operating history of the source;

identifying, by the software code executed by the hardware processor based on the operating history, an action for addressing the anomaly; and executing, by the software code executed by the hardware processor, the action.

13. The method of claim 12, wherein executing the action comprises powering down the source.

14. A method for use by a system including a hardware processor and a system memory storing a software code and a machine learning (ML) model, the method comprising:

receiving, by the software code executed by the hardware processor, a sequence of acoustic signals or a spectrogram corresponding to the sequence of acoustic signals, and data identifying a source of the sequence of acoustic signals;

translating, by the software code executed by the hardware processor and using the ML model, the sequence of acoustic signals or the spectrogram to one or more words each describing a respective acoustic signal pattern included in the sequence of acoustic signals or represented in the spectrogram;

obtaining, by the software code executed by the hardware processor and using the identifier of the source, a predetermined word-based description of an acoustic signature of the source;

determining, by the software code executed by the hardware processor and using the translated one or more words and the word-based description, whether an anomaly of the source is indicated; and outputting, by the software code executed by the hardware processor when the anomaly is indicated, an alert.

15. The method of claim 14, further comprising:

pre-processing the sequence of acoustic signals, by the software code executed by the hardware processor before translating the sequence of acoustic signals to the one or more words, to reduce signal noise unrelated to the source.

16. The method of claim 14, further comprising:

obtaining, by the software code executed by the hardware processor when the anomaly is indicated, an operating history of the source; and identifying, by the software code executed by the hardware processor based on the operating history, at least one of a cause of the anomaly or an action for addressing the anomaly.

17. The method of claim 16, wherein the alert includes at least one of the translated one or more words, the word-based description, the cause of the anomaly, or the action for addressing the anomaly.

18. The method of claim 14, wherein the source is a mechanical system.

19. The method of claim 14, wherein the source comprises one of a baggage claim carousel, an automated warehouse, a theme park attraction, a vehicle assembly line machine, an aviation system, a HVAC system, an engine, manufacturing equipment, or a computer server.

20. The method of claim 14, wherein at least one of the acoustic signature or the sequence of acoustic signals comprises humanly audible audio signals.

21. The method of claim 14, wherein at least one of the acoustic signature or the sequence of acoustic signals comprises humanly inaudible vibrations.

22. The method of claim 14, further comprising training, by the software code executed by the hardware processor, the ML model by:

obtaining an annotated dataset including a plurality of acoustic signal patterns each tagged with a respective word included in a predetermined vocabulary of mechanical sounds or actions;

partitioning the annotated dataset into a training dataset including a first subset of the plurality of acoustic signal patterns and respective word tags, and a validation dataset including a second subset of the plurality of acoustic signal patterns and respective word tags;

training, using the training dataset, the ML model to translate the first subset of the plurality of acoustic signal patterns to the first subset of respective word tags; and validating, using the validation dataset, the ML model for use.

* * * * *